United States Patent
Huynh et al.

(10) Patent No.: US 7,908,046 B2
(45) Date of Patent: Mar. 15, 2011

(54) METHOD AND DEVICE FOR MONITORING A POSITION INDICATION OF AN AIRCRAFT

(75) Inventors: Jean-Philippe Huynh, Tournefeuille (FR); Alain Guillet, Blagnac (FR); Stephane Dattler, Montlaur (FR); Gregory Ortet, Toulouse (FR)

(73) Assignee: Airbus France, Toulouse (FR)

( * ) Notice: Subject to any disclaimer, the term of this patent is extended or adjusted under 35 U.S.C. 154(b) by 437 days.

(21) Appl. No.: 12/123,327

(22) Filed: May 19, 2008

(65) Prior Publication Data

US 2008/0294306 A1 Nov. 27, 2008

(30) Foreign Application Priority Data

May 23, 2007 (FR) .................................... 07 03649

(51) Int. Cl.
*G06F 7/70* (2006.01)
(52) U.S. Cl. ................. 701/14; 701/3; 340/945
(58) Field of Classification Search ............... 701/3, 14; 340/945, 963; 342/357.32
See application file for complete search history.

(56) References Cited

U.S. PATENT DOCUMENTS

| 6,236,912 | B1 | 5/2001 | Bomans |
| 6,377,892 | B1 * | 4/2002 | Johnson et al. ............... 701/213 |
| 6,734,808 | B1 * | 5/2004 | Michaelson et al. ........... 340/984 |
| 7,782,229 | B1 * | 8/2010 | Barber .......................... 340/979 |
| 2002/0120391 | A1 * | 8/2002 | Nehls, III ....................... 701/120 |
| 2004/0189492 | A1 | 9/2004 | Selk |
| 2006/0253232 | A1 * | 11/2006 | Gerrity et al. .................... 701/16 |
| 2008/0140270 | A1 * | 6/2008 | Davis et al. ....................... 701/8 |

FOREIGN PATENT DOCUMENTS

FR 2 744 800 8/1997
FR 2 887 329 12/2006

OTHER PUBLICATIONS

Preliminary Search Report dated Jan. 15, 2008 w/ English translation.

* cited by examiner

*Primary Examiner* — Mark Hellner
*Assistant Examiner* — Helal A Algahaim
(74) *Attorney, Agent, or Firm* — Dickinson Wright PLLC

(57) ABSTRACT

A device and method calculate a global error relating to a position indication of an aircraft and compare the global error with a threshold value, which depends on flight constraints.

12 Claims, 2 Drawing Sheets

METHOD AND DEVICE FOR MONITORING A POSITION INDICATION OF AN AIRCRAFT

FIELD OF THE INVENTION

The present invention relates to a method and a device for monitoring a position indication of an aircraft, in particular of a transport airplane.

BACKGROUND OF THE RELATED ART

Within the framework of the present invention, a position indication represents a current position of the aircraft, which is determined in a standard manner, with the aid of information arising from onboard positioning means which cooperate with a satellite positioning system, for example of GNSS type ("Global Navigation Satellite System"), and of inertial information generated by an onboard standard inertial system.

To guide an aircraft as precisely as possible, it is necessary to have available, in real time, a position indication which is very reliable. This will in particular be necessary for future precision aerial operations of RNP AR type ("Required Navigation Performance with Approbation Required"), on approach and at takeoff, which require that the aircraft be made to navigate inside a predetermined corridor and not to leave it. Indeed, relief or other aircraft potentially lie outside this corridor. Patent application FR-2 887 329 describes a particular display device which is suited to an operation or procedure of RNP type. According to such a procedure, the aircraft is generally guided in accordance with a predetermined flight plan, while having to comply with strict performance constraints.

Moreover, it is known that in general the operations of RNP type are operations which are carried out essentially with the aid of standard receivers associated with a Global Navigation Satellite System of GNSS type which encompasses all the existing satellite navigation systems (GPS, Galileo, etc.), with the aid of an inertial system, and with the aid of at least one flight management system for example of FMS type.

For safety reasons, one or more alarms are generally provided for, which guarantee compliance with the aforesaid performance throughout the RNP operation. When such an alarm is emitted, ability to comply with the RNP performance is lost and is announced to the pilot. Depending on the cause of the alarm, the pilot must interrupt the operation or select other onboard systems. The rest of the aerial operation is then implemented with the navigation systems still available and their residual performance.

However, to do this, these still available navigation systems use the current positions which are the cause of the alarm (in accordance with performance criteria). So, the precision and integrity associated with the current position indication that is used for the rest of the aerial operation are not controlled and do not make it possible to guarantee that the pilot can, in complete safety, interrupt the ongoing RNP operation and perform an alternative operation making it possible to extract himself from the situation in a fully reliable manner.

Consequently, it appears to be necessary to be able to monitor a current position indication, so as to be able to forewarn the pilot or onboard systems, in the event of a reliability problem. This monitoring seems particularly suited, although not exclusively, to RNP operations of aforesaid type.

SUMMARY OF THE INVENTION

The present invention relates to a method which makes it possible to monitor, in a particularly effective manner, a position indication of an aircraft, which represents the current position of the aircraft and which is determined in a repetitive manner with the aid of information arising from onboard positioning means cooperating with a satellite positioning system and of inertial information generated by an onboard inertial system.

For this purpose, according to the invention, the following series of successive operations is carried out in an automatic and repetitive manner:
a) at least one first position error which represents an estimated maximum error of said position indication of the aircraft is determined, and is monitored;
b) at least one second position error which represents an estimated maximum error of the position of the aircraft for a particular future duration, and which depends on a problem in determining said position indication, is determined;
c) at least the sum of said first and second position errors is formed so as to obtain a global error;
d) this global error is compared with at least one threshold value which depends on flight constraints of the aircraft which must fly inside a predetermined flight corridor; and
e) if said global error is greater than said threshold value, an alarm signal is emitted.

Thus, by virtue of the invention, it is possible to monitor a current position of the aircraft (which is determined with the aid of first information relating to a satellite positioning system for example of GNSS type and of second information of inertial type) and to detect any situation for which this current position does not make it possible to guarantee the aircraft that it can comply with particular flight constraints, in the event of a problem in determining said position indication (in particular in the event of loss of said first information). Preferably, said flight constraints relate to required navigation and guidance performance, for example of RNP type.

The present invention applies to all the flight phases for which a position indication which is determined in the aforesaid manner is available. It finds however its most beneficial application in non-precision approach operations and in take-off operations, in particular in a context of RNP type such as aforesaid.

In a particular embodiment, said inertial system comprises several inertial platforms. Each of said inertial platforms makes it possible to determine a current position of the aircraft. In this case:
   in step a), a plurality of first position errors is determined, each of these first position errors relating to one of these current positions and being associated with the inertial platform which has determined the corresponding current position;
   in step b), a plurality of second position errors associated respectively with said inertial platforms is determined; and
   in step c), the sum of first and second position errors which are associated with the same inertial platform is formed so as to obtain a plurality of sums, and said global error is determined on the basis of this plurality of sums.

In a particular embodiment, in step b), a second position error is determined by assuming a total loss of the information arising from said onboard positioning means which cooperate with a satellite positioning system for example of GNSS type.

Furthermore, advantageously, in step b), said second position error is determined by taking account of the flight dynamics (variation in speed or in trim) relating to the future flight of the aircraft over said future duration.

Additionally, so as to be able to obtain a more precise indication as regards any reliability problem due to a position error:

in step d), a plurality of threshold values, each of which is associated with particular flight constraints, is envisaged and the global error is compared with each of these threshold values; and in step e), in the event that an alarm signal is emitted, the threshold values which are exceeded by said global error and those which are not are indicated.

Thus, as each threshold value is defined so as to allow the aircraft to comply with particular flight constraints, one knows which flight constraints can be complied with (that is to say those where the global error does not exceed the corresponding threshold values) and which flight constraints cannot be complied with (that is to say those where the global value does not exceed the corresponding threshold values).

Additionally, in an advantageous manner, upon the emission of an alarm signal in step e), an additional step f) is carried out, in which the inertial system calculates, in an automatic and repetitive manner, a current position with the aid of a pure-inertia mode (or "coasting" mode), for which the information arising from at least one receiver of GNSS type of said onboard positioning means are discarded from the calculation of the inertial hybrid position after the emission of the alarm signal (signaling a problem relating to this information). Thus, even if the position indication is not reliable, because of a problem relating to the information arising from the onboard positioning means, a current position which is determined by the inertial system is always available. Accordingly, the latter uses the inertial information which is not affected by the reliability problem and which is therefore always valid and the latest valid information arising from said positioning means.

Moreover, so as in this case to increase the precision of the current position, in an advantageous manner, said inertial system comprises a plurality of inertial platforms, each of which calculates a current position, and in step f), a consolidated current position of the aircraft is determined on the basis of these various current positions.

Furthermore, advantageously, upon the emission of an alarm signal in step e), steps a) to e) continue to be carried out in an automatic and repetitive manner, and as soon as the global error again becomes less than the threshold value, the implementation of step f) is stopped, that is to say the inertial system ceases the calculation of the current position with the aid of the pure-inertia mode, such as provided for in step f), thereby making it possible to return to normal operation of the inertial system and to a standard mode of determining said position indication, such as aforesaid, when the alarm conditions are no longer fulfilled.

The present invention also relates to a device for monitoring a position indication of an aircraft, in particular of a transport airplane, said position indication being determined with the aid of information arising from onboard positioning means cooperating with a satellite positioning system and of inertial information generated by an onboard inertial system.

For this purpose, according to the invention, said device is noteworthy in that it comprises:

means for determining at least one first position error which represents an estimated maximum error of said position indication of the aircraft;

means for determining at least one second position error which represents an estimated maximum error of the position of the aircraft for a particular future duration, and which depends on a problem in determining said position indication;

means for forming at least the sum of said first and second position errors so as to obtain a global error;

means for comparing this global error with at least one threshold value which depends on flight constraints of the aircraft which must fly inside a predetermined flight corridor; and means for emitting an alarm signal if said global error is greater than said threshold value.

The present invention also relates to an onboard system for generating a position indication of an aircraft which forms, for example, part of a navigation system and which comprises:

onboard positioning means which cooperate with a satellite positioning system, for example of GNSS type;

an inertial system which is coupled to the onboard GNSS receiver(s) and which generates inertial and hybrid information relating to the aircraft;

calculation means which determine a position indication representing a current position of the aircraft, with the aid of information arising from said positioning means and of the inertial information generated by said inertial system; and a monitoring device such as the aforesaid, for monitoring the position indication calculated by said calculation means and for emitting an alarm signal when this position indication does not allow the aircraft to comply with particular flight constraints.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
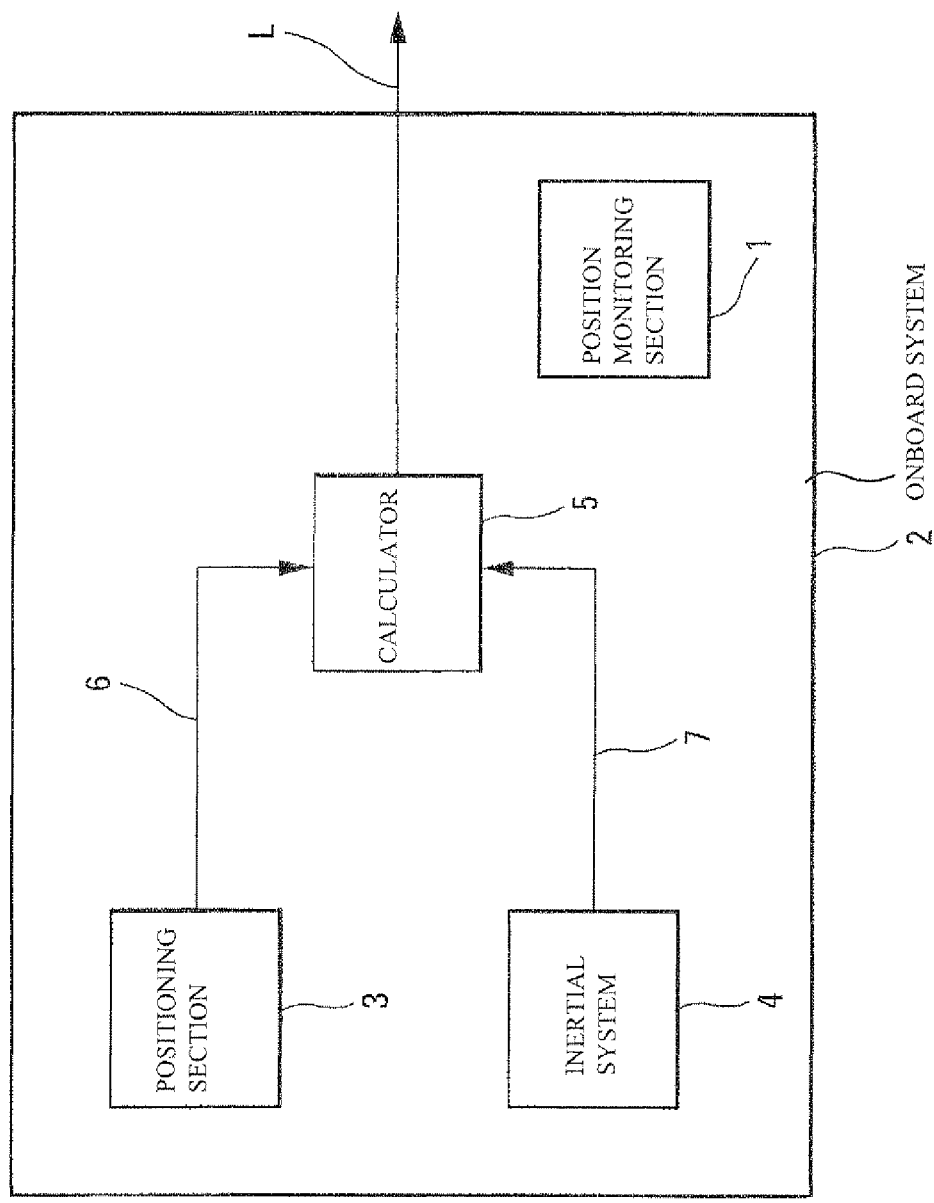
FIG. 1 is the schematic diagram of a system for generating a position indication of an aircraft, which comprises a monitoring device in accordance with the invention.

The device 1 in accordance with the invention forms part of a system (onboard) 2 for generating a current position indication of an aircraft (not represented), and it is intended to monitor the current position indications generated by this system 2 which is represented in FIG. 1.

In a standard manner, said system 2 comprises:

onboard positioning means 3, which comprise a receiver which cooperates with a standard satellite positioning system, for example of the GNSS type ("Global Navigation Satellite System"), and which provide (in a repetitive manner) first information relating to a current position of the aircraft;

an inertial system 4 which comprises, for example, several inertial platforms and which generates in a repetitive manner inertial (and hybrid) information making it possible to determine or to refine a current position of the aircraft. It is known that an inertial platform is a precision mechanical and electronic assembly which comprises sensors (accelerometers, gyrometers), as well as calculation means, and which is capable of providing in a repetitive manner the position coordinates and the components of speed and of acceleration of the aircraft aboard which it is installed; and calculation means 5 which in FIG. 1 are connected by way of links 6 and 7 respectively to said positioning means 3 and to said inertial system 4 and which are formed so as to determine, in a standard manner, a position indication on the basis of the information arising from said positioning means 3 and of the inertial information generated by said inertial system 4. This position indication represents a hybrid current position of the aircraft, and it can be transmitted by way of a link L to user systems, in particular to systems intended for guiding and navigating the aircraft. This current position indication is generated in a repetitive manner, for example every second.

Said calculation means 5 can be independent or be integrated into a system of the aircraft such as the inertial system 4 for example.

As regards the system 2, it can form part of a standard navigation system of the aircraft.

Figure 2:
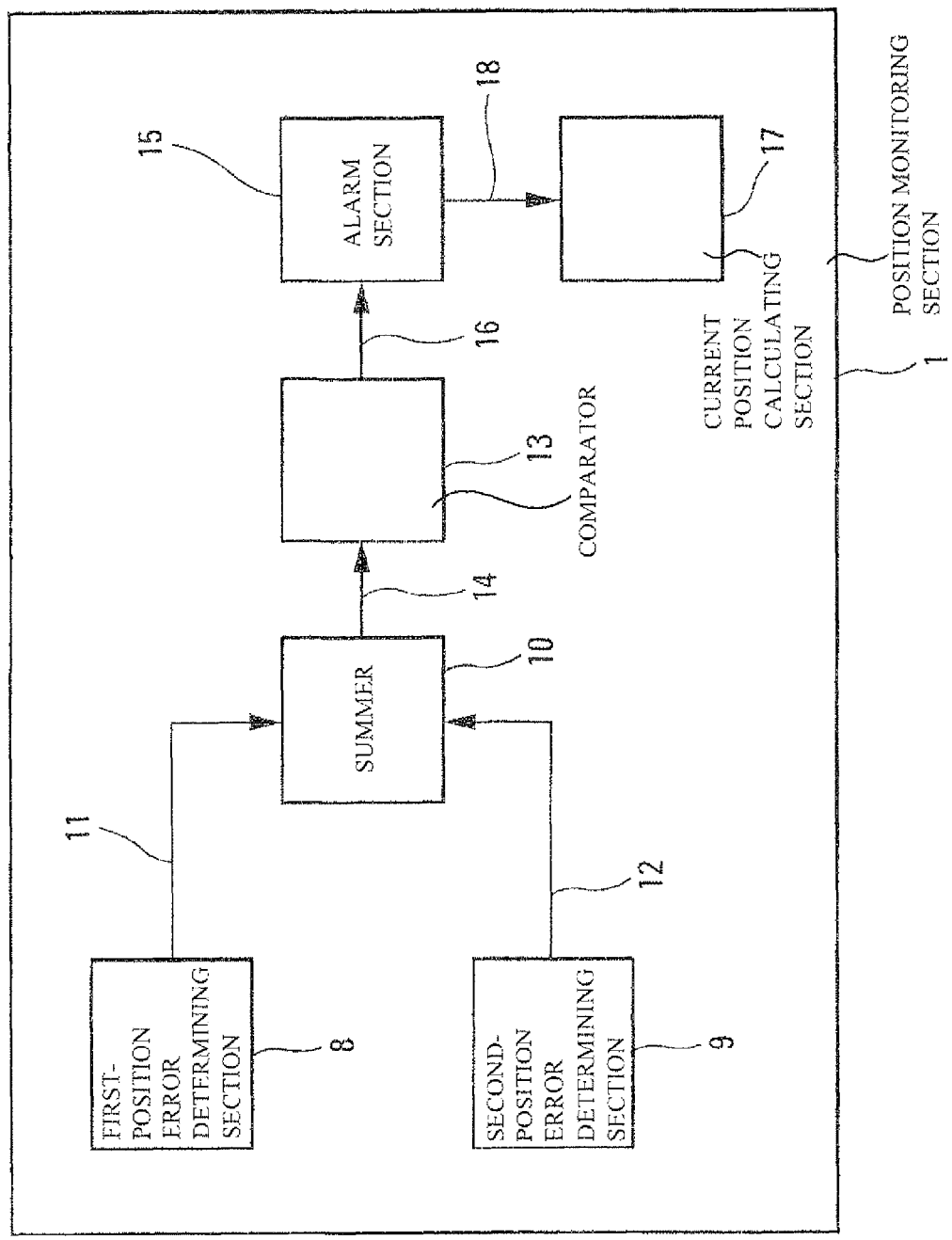
FIG. 2 is the schematic diagram of a device for monitoring a position indication of an aircraft, in accordance with the invention.

According to the invention, said device 1 which is intended to monitor any position indication generated by said calculation means 5 comprises, as represented in FIG. 2:

means 8 for determining at least one first position error which represents an estimated maximum error of said monitored position indication;

means 9 for determining at least one second position error which represents an estimated maximum error of the position of the aircraft for a particular future duration (starting from the current instant), and which depends on a problem in determining said position indication, as specified below;

means 10 which are connected by way of links 11 and 12 respectively to said means 8 and 9 and which are formed so as to form at least the sum of said first and second position errors (determined by said means 8 and 9) so as to obtain a global error;

means 13 which are connected by way of a link 14 to said means 10 and which are intended to compare this global error received from said means 10 with at least one threshold value which depends on flight constraints of the aircraft (which must, within the framework of the present invention, fly inside a predetermined flight corridor); and means 15 which are connected by way of a link 16 to said means 13 and which are formed so as to emit an alarm signal, if said global error is greater than said threshold value, so as to be able to forewarn the pilot or possibly various onboard systems of an error relating to the position indication generated by the system 1, in particular so that this position indication is not used by this pilot or these onboard systems.

Said means 15 can comprise elements for emitting an audible alarm and/or elements for displaying a characteristic symbol on at least one particular viewing screen of the flight deck.

Thus, the device 1 in accordance with the invention is able to monitor a current position of the aircraft (which is determined with the aid of first information relating to a satellite positioning system for example of GNSS type and of second information of inertial type) and to detect any situation for which this current position does not make it possible to guarantee the aircraft that it can comply with particular flight constraints, in the event of a problem in determining said position indication (in particular in the event of loss of said first information determined by the positioning means 3). Preferably, said flight constraints relate to required navigation and guidance performance, for example of RNP type ("Required Navigation Performance").

The device 1 in accordance with the invention applies to all the flight phases for which a position indication which is determined in the aforesaid manner is available. It finds however its most beneficial application in non-precision approach operations and in takeoff operations, in particular in a context of RNP type.

In a particular embodiment, said inertial system 4 comprises several inertial platforms. Each of said inertial platforms determines a current (hybrid) position of the aircraft, for example by using a Kalman filter. In this case:

the means 8 determine a plurality of first position errors. Each of these first position errors relates to one of these current positions and is associated with the inertial platform which has determined the corresponding current position;

the means 9 determine a plurality of second position errors associated respectively with said inertial platforms; and the means 10 form the sum of first and second position errors which are associated with the same inertial platform so as to obtain a plurality of sums, and they determine, on the basis of this plurality of sums, said global error, in particular by using a consolidation procedure of standard type.

This makes it possible to optimize the global error and to thus optimize the monitoring implemented by the device 1.

Said means 3 carry out a standard estimation of said first position error. This estimation is a statistical variable with an order of magnitude of from $10^{-7}$ per flying hour to $10^{-9}$ per flying hour. This makes it possible to define a circle about the current effective position of the aircraft, in which the position estimated by the system 2 is certain to be found.

Additionally, so as to be able to obtain a more precise indication as regards any reliability problem due to a position error:

the means 13 provide for a plurality of threshold values, each of which is associated with particular flight constraints, and they compare the global error with each of these threshold values; and in the event that an alarm signal is emitted, the means 15 indicate the threshold values which are exceeded by said global error and those which are not.

Thus, as each threshold value is defined so as to allow the aircraft to comply with particular flight constraints, one knows which flight constraints can be complied with (that is to say those where the global error does not exceed the corresponding threshold values) and which flight constraints cannot be complied with (that is to say those where the global value does not exceed the corresponding threshold values).

In a particular embodiment, the device 1 comprises, moreover, means 17 which are connected by way of a link 18 to said means 15 and which form part, preferably, of the inertial system 4 (or possibly of the calculation means 5). These means 17 are triggered upon the emission of an alarm signal by said means 15 and are formed so as to calculate, in an automatic and repetitive manner, a current position of the aircraft, doing so with the aid of a standard pure-inertia mode, for which the information arising from the receiver or receivers of said positioning means 3 are discarded from the inertial hybrid position calculation after the emission of the alarm signal (signaling a problem relating to this information). Thus, even if the position indication is not reliable, because of a problem relating to the information arising from the positioning means 3, a current position which is determined by the means 17 is always available to the system 2. Accordingly, said means use:

the inertial information which are not affected by the reliability problem and which are therefore always valid, these inertial information being generated in a repetitive manner; as well as the latest valid information arising from said positioning means 3, the latter information being frozen.

In the latter case, the worst case conceivable is taken account of, namely that where the system 2 no longer trusts the information provided by the positioning system 3. The reasons for this can be very diverse: several satellite faults, partial jamming of the signals due to a particular radiofrequency local environment, etc.

Moreover, so as in this case to increase the precision of the current position, said inertial system 4 comprises a plurality of inertial platforms, each of which calculates a current position, and the means 17 determine a consolidated current position of the aircraft on the basis of these various current positions (by using a standard consolidation procedure).

Furthermore, advantageously, upon the emission of an alarm signal by the means 15, the device 1 continues to carry out the aforesaid monitoring, and as soon as the global error again becomes less than the threshold value, the means 17 cease the calculation of the current position with the aid of the pure-inertia mode, thereby making it possible to return to normal operation of the inertial system and to a standard mode of determining said position indication (by the system 1), such as aforesaid, when the alarm conditions are no longer fulfilled.

Furthermore, in a particular embodiment, the means 9 determine said second position error by taking account of the flight dynamics (variation in speed or in altitude) relating to the future flight of the aircraft over said future duration.

Said means 9 determine an estimation of the maximum position error of the aircraft over said future duration. This estimation of the maximum error is a statistical variable with an order of magnitude of from $10^{-7}$ per flying hour to $10^{-9}$ per flying hour.

As far as the determination of this second position error by the means 9 is concerned, various alternative embodiments are conceivable, which pertain to the worst cases to be considered that relate to the problem in determining the position indication.

Firstly, account is taken of the position information.

A worst case is to consider the total loss of the signals arising from the positioning means 3, as indicated previously, or a sharp degradation in performance.

Other cases, that are very improbable but less pessimistic, can be considered, such as for example the loss of three satellites of the satellite positioning system or the loss of a GNSS frequency. It is then possible to calculate the resulting degraded GNSS performance. It will be noted that the pure-inertia mode makes it possible to consider the total loss of the GNSS signals or a sharp degradation in performance. From a functional point of view, the means 17 which form part preferably of the inertial system 4 calculate, in real time, an instantaneous position and an estimation of the maximum position error at a given time horizon (or future duration), for example 6 minutes, by using their inertial current errors and by propagating into the future the effect that they produce on the inertial position. For this purpose, the means 17 use the gyrometric and accelerometric error models of the inertial system 4, possibly recalibrated by the means 3, when they are available and reliable.

Secondly, account is taken of said future duration.

In a first embodiment (which is easy to implement), said future duration is a fixed duration.

In a second embodiment, this value is dispatched by an external computer, in particular by a flight management system of FMS type. In this case, the FMS system updates this value as a function of the time remaining, which progresses as the aircraft advances, by using arrival point estimation information of ETA ("Estimated Time of Arrival") type. Accordingly, the FMS system must determine the point of the trajectory which constitutes the end of the operation to be considered. This point is, for example, the last point of the coded procedure of an interrupted approach or the last constrained point of a takeoff procedure. Said FMS system can also utilize information from a navigation database to identify the sub-part of the trajectory which requires the desired performance, so as to deduce therefrom the value of said future duration. Indeed, the FMS databases specify the trajectory portions that are constrained by the RNP criterion, and in particular, those that are highly constrained, for example by RNP 0.1 or RNP 0.3.

Thirdly, account is taken of the aircraft's trajectory, considered from a dynamic point of view.

The prediction calculation must be optimized so as not to be too pessimistic. Indeed, the degradation in the pure-inertia position error also depends on the dynamics of the aircraft, in particular the low-frequency dynamics due to the operation (acceleration, turning). One of the problems which arises is the way to bound the position error above, without however bounding it above too significantly.

Said means 9 comprise, preferably, an air data inertial reference system of ADIRS type and a flight management system of FMS type. In this case, several alternative embodiments, that are more or less complex and expensive in calculation terms, are conceivable:

the ADIRS system considers in the calculation of the second position error a typical trajectory which is determined once and for all during the design of the system. This solution (particularly simple to implement) is only applicable on approach and at takeoff (limited duration);

the FMS system dispatches the real trajectory (start to end of operation considered) to the ADIRS system in accordance with a standardized avionics protocol (ARINC 702A type) and the calculation is carried out in the ADIRS system;

the ADIRS system dispatches its error model in accordance with an avionics protocol to be defined and the calculation is carried out in the FMS system;

the FMS system identifies the dynamics required by the trajectory and formulates a simplified synthesis which is dispatched to the ADIRS system. The synthetic simplified model formulated by the FMS system is representative of the number and of the amplitude of the dynamic variations in turning rate and in acceleration. In this case, an exemplary embodiment pertains to the dynamics of the turns. In this example, the FMS system identifies, for the trajectory considered, trajectory portions along which the roll of the aircraft varies and deduces an upper bound on the total time of these portions and the number of dynamic portions. As the turning rate in managed mode is fixed in the guidance system (generally of the order of 3 degrees per second or of 5 degrees per second according to aircraft type), the ADIRS system can also make this assumption. The FMS system dispatches the aforesaid parameters. The ADIRS system carries out a performance prediction estimation calculation with a low frequency (for example 30 seconds), by considering the roll rate equal to 5 degrees per second over this time, and this number of changes of dynamics. It will be noted that the previous variants relating to the roll rate can also apply to the acceleration. Acceleration is understood to mean that undergone when turning (centrifugal) and that due to the thrust of the engines (nonzero on takeoff).

It will be noted that, in a particular embodiment, said means 10 (which form the sum of two position errors) are integrated into the ADIRS system.

The invention claimed is:

1. A method for monitoring a position indication of an aircraft, said position indication representing a current position of the aircraft, which is determined with the aid of information arising from an onboard positioning section, which cooperates with a satellite positioning system, and of inertial information generated by an onboard inertial system, the method comprising the following series of successive operations that are carried out in an automatic and repetitive manner:
   a) determining at least one first position error which represents an estimated maximum error of said position indication of the aircraft;
   b) determining at least one second position error which represents an estimated maximum error of the position of the aircraft for a particular future duration, and which depends on a problem in determining said position indication;
   c) summing said first and second position errors so as to obtain a global error;
   d) comparing the global error with at least one threshold value which depends on flight constraints of the aircraft, which must fly inside a predetermined flight corridor; and
   e) emitting an alarm signal if said global error is greater than said threshold value.

2. The method as claimed in claim 1, wherein:
   said inertial system comprises several inertial platforms, each of said inertial platforms making it possible to determine a current position of the aircraft,
   in step a) a plurality of first position errors is determined, each of these first position errors relating to one of these current positions and being associated with the inertial platform which has determined the corresponding current position,
   in step b) a plurality of second position errors associated respectively with said inertial platforms is determined, and
   in step c) the sum of first and second position errors which are associated with the same inertial platform is formed so as to obtain a plurality of sums, and said global error is determined on the basis of this plurality of sums.

3. The method as claimed in claim 1, wherein, in step b), said second position error is determined by assuming a total loss of the information arising from said onboard positioning section.

4. The method as claimed in claim 1, wherein that, in step b), said second position error is determined by taking account of the flight dynamics relating to the future flight of the aircraft over said future duration.

5. The method as claimed in claim 1, wherein:
   in step d), the global error is compared with each of a plurality of threshold values, and
   in step e), in the event that the alarm signal is emitted, the threshold values which are exceeded by said global error are indicated.

6. The method as claimed in claim 1, wherein, upon the emission of the alarm signal in step e), an additional step 1) is carried out, in which the inertial system calculates, in an automatic and repetitive manner, a current position with the aid of a pure-inertia mode, for which the information arising from at least one receiver of said onboard positioning section is discarded from the position calculation after the emission of the alarm signal.

7. The method as claimed in claim 6, wherein:
   the inertial system calculates the current position with the aid of the pure-inertia mode and the latest valid information provided by the onboard positioning section,
   said inertial system comprises a plurality of inertial platforms, each of which calculates a current position, and
   in step f), a consolidated current position of the aircraft is determined on the basis of these various current positions.

8. The method as claimed in claim 6, wherein, upon the emission of the alarm signal in step e), steps a) to e) continue to be carried out in an automatic and repetitive manner, and as soon as the global error again becomes less than the threshold value, the inertial system ceases the calculation of the current position with the aid of the pure-inertia mode, such as provided for in step f).

9. The method as claimed in claim 1, wherein said flight constraints relate to required navigation and guidance performance.

10. A device for monitoring a position indication of an aircraft, said position indication representing a current position of the aircraft and being determined with the aid of information arising from an onboard positioning section, which cooperates with a satellite positioning system, and of inertial information generated by an onboard inertial system, the device comprising:
    a first position-error determining section that determines at least one first position error which represents an estimated maximum error of said position indication of the aircraft;
    a second position-error determining section that determines at least one second position error which represents an estimated maximum error of the position of the aircraft for a particular future duration, and which depends on a problem in determining said position indication;
    a summer that sums said first and second position errors so as to obtain a global error;
    a comparator that compares the global error with at least one threshold value which depends on flight constraints of the aircraft, which must fly inside a predetermined flight corridor; and
    an alarm section that emits an alarm signal if said global error is greater than said threshold value.

11. A method for monitoring a position indication of an aircraft, said position indication representing a current position of the aircraft, which is determined with the aid of information arising from an onboard positioning section, which cooperates with a satellite positioning system, and of inertial information generated by an onboard inertial system, the method comprising the following series of successive operations that are carried out in an automatic and repetitive manner:
    a) determining at least one first position error which represents an estimated maximum error of said position indication of the aircraft;
    b) determining at least one second position error which represents an estimated maximum error of the position of the aircraft for a particular future duration, and which depends on a problem in determining said position indication;
    c) summing said first and second position errors so as to obtain a global error;
    d) comparing the global error with at least one threshold value which depends on flight constraints of the aircraft, which must fly inside a predetermined flight corridor; and e) emitting an alarm signal if said global error is greater than said threshold value, wherein:
f) comparing the global error to a plurality of threshold values, and
g) indicating, in the event that the alarm signal is emitted, the threshold values which are exceeded by said global error and those which are not.

12. The method as claimed in claim 4, wherein to determine the second position error the method further comprises:
identifying, for a trajectory of the future flight, trajectory portions along which the roil of the aircraft varies,
deducing an upper bound on the total time the aircraft will fly along the trajectory portions,
deducing the number of dynamic variations of turning rate for the aircraft while flying along the trajectory portions, and
calculating a predicted performance of the aircraft based on a roll rate over the upper bound of the total time and the number of dynamic variations.

* * * * *